L. S. BROWN.
MEANS FOR TIRE INFLATION.
APPLICATION FILED NOV. 7, 1908.

946,717.

Patented Jan. 18, 1910.

Witnesses:
Louis W. Gratz
Grace Timms

Inventor:
Luther S. Brown

UNITED STATES PATENT OFFICE.

LUTHER S. BROWN, OF LEMOORE, CALIFORNIA.

MEANS FOR TIRE INFLATION.

946,717.  Specification of Letters Patent.  Patented Jan. 18, 1910.

Application filed November 7, 1908. Serial No. 461,575.

*To all whom it may concern:*

Be it known that I, LUTHER S. BROWN, a citizen of the United States of America, residing at Lemoore, in the county of Kings and State of California, have invented new and useful Means for Tire Inflation, of which the following is a specification.

This invention relates to inflation of automobile tires and the like, and the main object of the invention is to provide means whereby such inflation may be accomplished quickly and easily and without the necessity of stopping the vehicle.

Other objects of the invention will appear hereinafter.

The accompanying drawings illustrate the invention.

Figure 1:
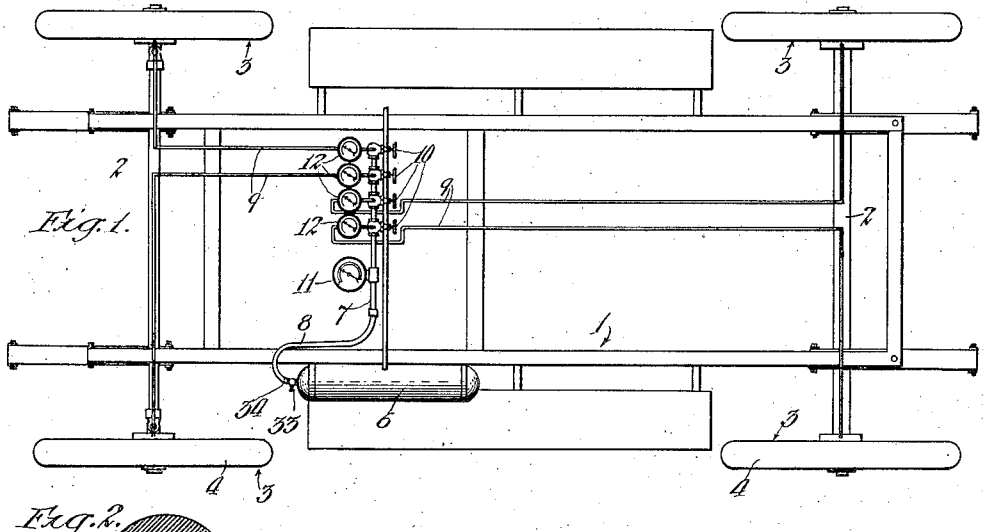
Figure 2:
Figure 3:
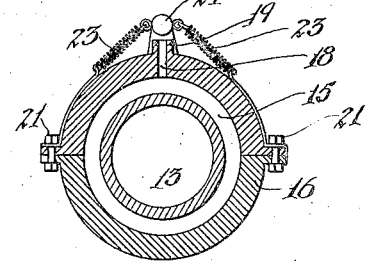
Figure 4:
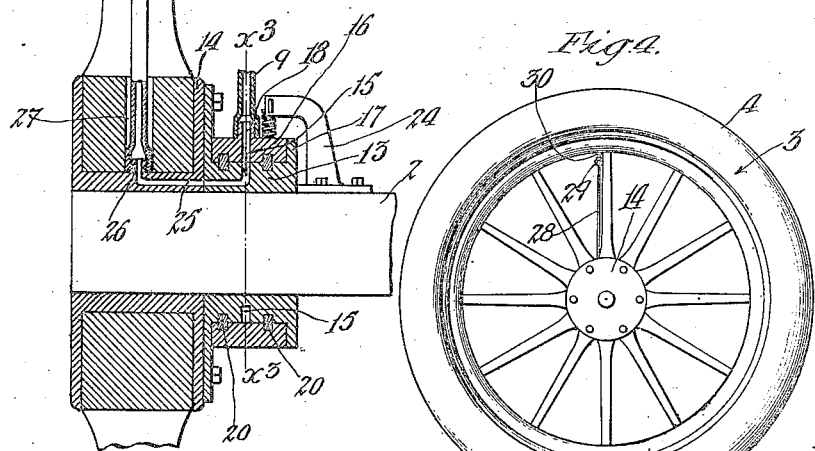

Figure 1 is a plan of the chassis of an automobile showing the application of my invention thereto. Fig. 2 is a partial vertical section of a wheel of an automobile showing the means of conducting compressed gas to the interior of the tire. Fig. 3 is a transverse section on the line $x^3$—$x^3$ in Fig. 2. Fig. 4 is a side elevation of an automobile wheel.

1 designates the running gear frame of an automobile provided with axles 2, on which are mounted the automobile wheels 3. The said wheels are provided with pneumatic tires 4. The means for charging or inflating these tires with compressed gas, for example, carbonic acid gas, or air, or other gas, comprises a storage tank or reservoir 6 mounted in suitable position on the running gear frame or other part of the automobile, a main pipe 7 connected to said tank as by means of a fixed pipe 8, a plurality of pipes 9, connected to the respective tires of the automobile wheels and valves 10 controlling communication between the said main and the said pipes, respectively. A main pressure gage 11, connected to the reservoir or the main pipe 7, serves to indicate the pressure existing in the reservoir, and an auxiliary pressure gage 12 in each of the distributing pipes 9 serves to indicate the pressure which is being applied to the tire. In order to enable the gas to be supplied to the tire without the necessity of stopping the vehicle, or of making a coupling to the tire every time inflation is required the pipes 9 communicate with the automobile tires through means providing for continuous communication irrespective of the position of the wheels. Such means comprises a coupling consisting of an inner member 13 connected to the hub 14 of the automobile wheel to rotate therewith and provided with an annular groove 15, and an outer annular member or collar 16 surrounding the member 13 and having a passage 18, and a nipple 19 communicating with said passage and adapted to enter the end of the supply pipe 9. Inner member 13 has a flange 17 for holding the outer member 16 in position and packing rings 20 are provided for preventing leakage. Said outer member is split, its two halves being fastened together by bolts 21, and said outer member 16 is held from rotation by springs 23 connected thereto and to a bracket 24 fixed on the axle 2. These springs yieldingly hold the member 16 from rotation, while allowing the movements necessitated by the strains on the parts, without binding of the bearing. The annular groove 15, aforesaid, in the inner member 13 communicates by a duct 25 in a flanged hub 14 with a nipple 26 on the flanged hub 14 extending in a bore 27 in a spoke 3 of the automobile wheel, and a pipe 28 screwing onto said nipple is connected by a union 29 with a valve 30 communicating with the interior of the pneumatic tire 4. The pipe 28 preferably extends close to one of the spokes 3 of the automobile wheel so as to protect said pipe from injury.

The operation is as follows: The reservoir or tank 6 having been charged with carbonic gas or compressed air or other gas to a suitable pressure, and it being desired to inflate any one or more of the tires, the corresponding valve 10 is opened, allowing the compressed gas to flow through the appropriate pipe 9 to the tire requiring inflation. This flow of gas will ensue irrespective of the condition of rotation or of the angular position of the wheel whose tire is being inflated. When the pressure in the tire has reached the proper point, as indicated by the reading on the corresponding gage 12, the valve is closed.

The operation of inflating the tire is almost instantaneous and necessitates no delay for the attaching of a coupling or the stopping and starting of the machine. The storage tank 6 may be recharged when necessary or may be removed and a charged tank substituted, said tank having a valve 33 and a coupling 34 for that purpose.

What I claim is:

The combination of an axle, a wheel having a pneumatic tire provided with a valve, a hub formed with a duct and a nipple, and a spoke formed with a bore, a pipe connected with the nipple at its inner end, a union connecting the outer end of the pipe with the valve, an inner member formed with an annular groove connected with the duct in the flanged hub and provided with a flange, a split outer annular member formed with a passage and a nipple, means for securing the parts of the outer annular member together, a bracket fixed to the axle, and springs yieldingly connecting the outer annular member with the bracket.

In testimony whereof, I have hereunto set my hand at Los Angeles, California, this 31st day of October 1908.

LUTHER S. BROWN.

In presence of—
G. T. HACKLEY,
P. H. SHELTON.